United States Patent [19]
Scaramucci

[11] Patent Number: 5,386,847
[45] Date of Patent: Feb. 7, 1995

[54] TOP-ENTRY CHECK VALVE WITH THREADED FASTENERS

[76] Inventor: John P. Scaramucci, 10724 Woodridden, Oklahoma City, Okla. 73170

[21] Appl. No.: 181,639

[22] Filed: Jan. 13, 1994

Related U.S. Application Data

[60] Division of Ser. No. 108,146, Aug. 17, 1993, Pat. No. 5,307,835, which is a continuation of Ser. No. 961,106, Oct. 14, 1992, abandoned, which is a division of Ser. No. 762,540, Sep. 18, 1991, Pat. No. 5,161,570.

[51] Int. Cl.⁶ .............................................. F16K 15/03
[52] U.S. Cl. ................................. 137/454.2; 137/527.8
[58] Field of Search ........ 137/454.2, 454.5, 527–527.8

[56] References Cited

U.S. PATENT DOCUMENTS

| | | | |
|---|---|---|---|
| 483,635 | 10/1892 | Prince, Jr. | 137/454.2 |
| 485,745 | 11/1892 | Loveland . | |
| 556,636 | 3/1896 | Rowe . | |
| 846,317 | 3/1907 | Kiddle | 137/527.4 |
| 1,399,684 | 12/1921 | Belcher | 137/527 |
| 1,647,036 | 10/1927 | Dileo . | |
| 1,827,913 | 10/1931 | Rymal . | |
| 2,048,088 | 7/1936 | Wagner | 251/126 |
| 2,282,532 | 5/1942 | Shenk | 251/123 |
| 2,664,264 | 12/1953 | Fennema | 251/123 |
| 2,730,119 | 1/1956 | Bredtschneider et al. | 137/327 |
| 2,750,955 | 6/1956 | Bredtschneider et al. | 137/454.2 |
| 2,844,164 | 7/1958 | Robbins | 137/454.6 |
| 2,918,934 | 12/1959 | Wheatley | 137/527.2 |
| 2,923,317 | 2/1960 | McInerney | 137/527.2 |
| 2,928,416 | 3/1960 | Balhouse | 137/527.8 |
| 3,075,547 | 1/1963 | Scaramucci | 137/516.29 |
| 3,119,594 | 1/1964 | Heggem | 251/228 |
| 3,295,550 | 1/1967 | Scaramucci | 137/527.4 |
| 3,394,731 | 7/1968 | Elliott | 137/527.8 |
| 3,817,277 | 6/1974 | Wheatley | 137/515.7 |
| 3,934,608 | 1/1976 | Guyton | 137/527.8 |
| 4,054,153 | 10/1977 | Guyton | 137/527 |
| 4,223,697 | 9/1980 | Pendleton | 137/527.8 |
| 4,230,150 | 10/1980 | Scaramucci | 137/527 |
| 4,252,144 | 2/1981 | Scaramucci | 137/454.6 |
| 4,508,139 | 4/1985 | Teumer | 137/315 |
| 4,796,663 | 1/1989 | Scaramucci | 137/515.5 |

FOREIGN PATENT DOCUMENTS 1806409 9/1969 Germany .
44-12462 6/1969 Japan .

*Primary Examiner*—Robert G. Nilson
*Attorney, Agent, or Firm*—Dunlap, Codding & Lee

[57] ABSTRACT

A top-entry check valve having a seat, cage, disc and removable bonnet utilizes threaded fasteners to prevent movement of the seat, cage and disc in the downstream direction. An annular shoulder in the valve body prevents movement of the seat, cage and disc in the upstream direction. The disc has a hinge pin which is cradled in hinge pin supports of the cage. Removal of the bonnet allows access to the valve chamber for replacement of the seat, cage, disc or threaded fasteners.

3 Claims, 13 Drawing Sheets

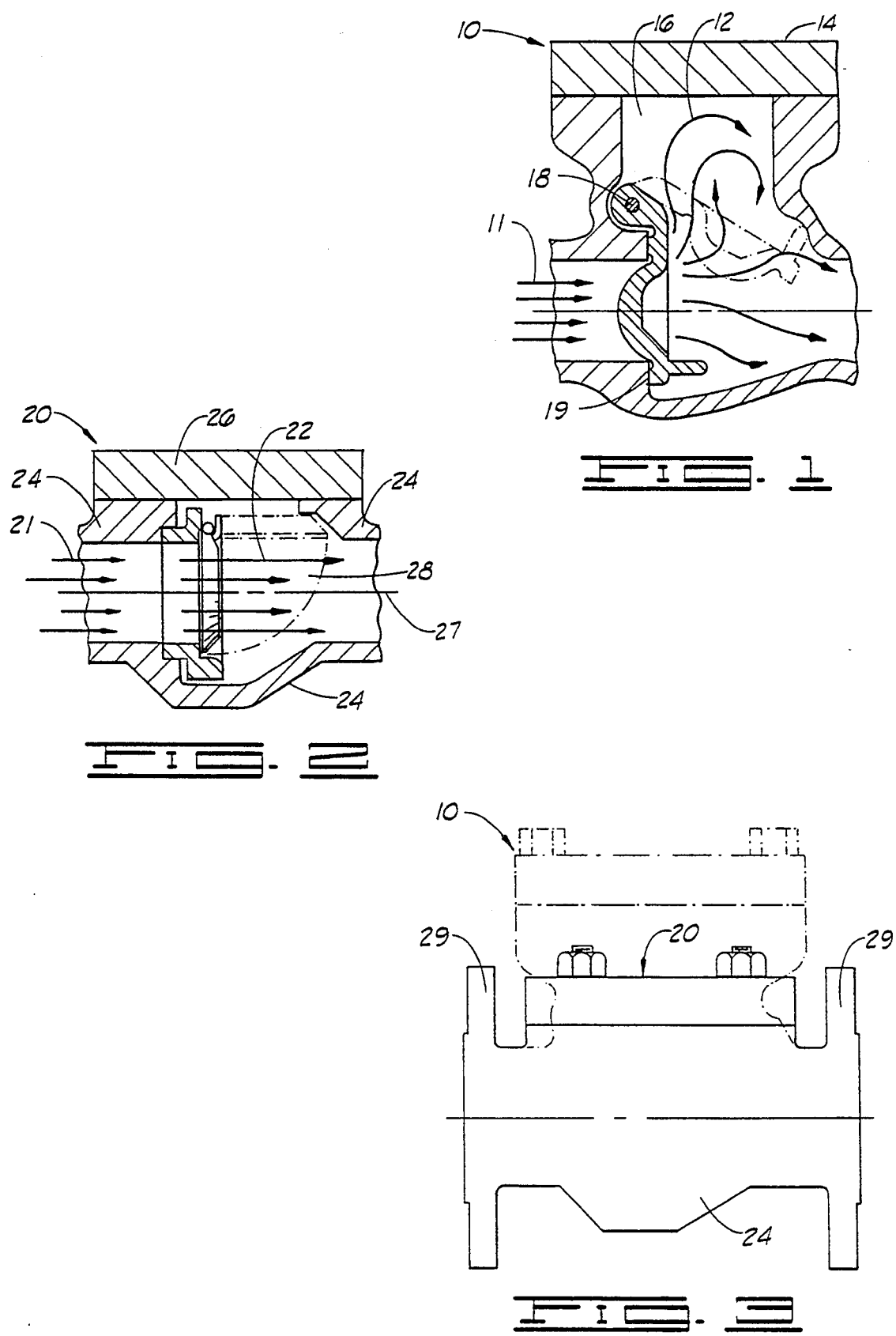

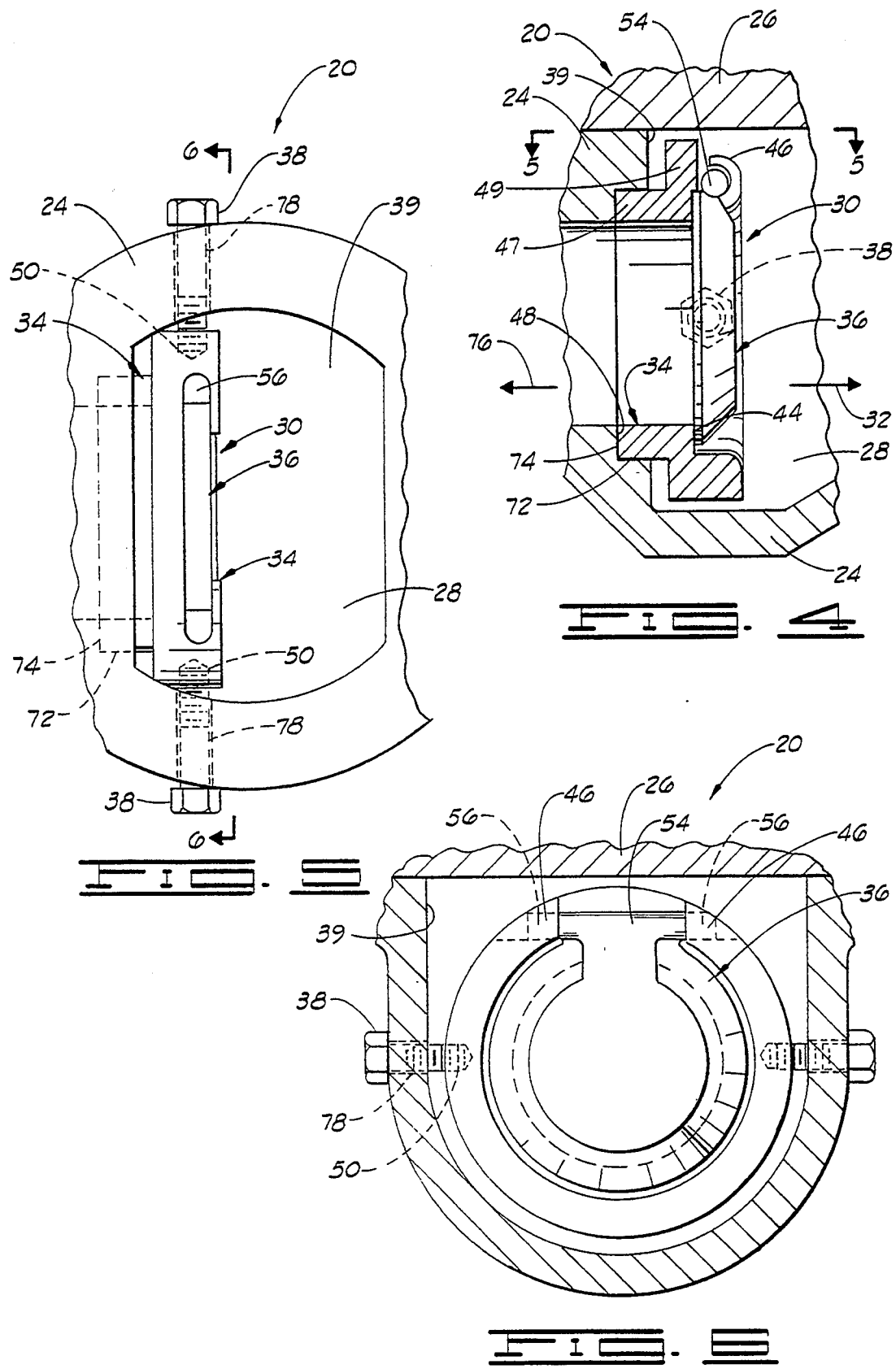

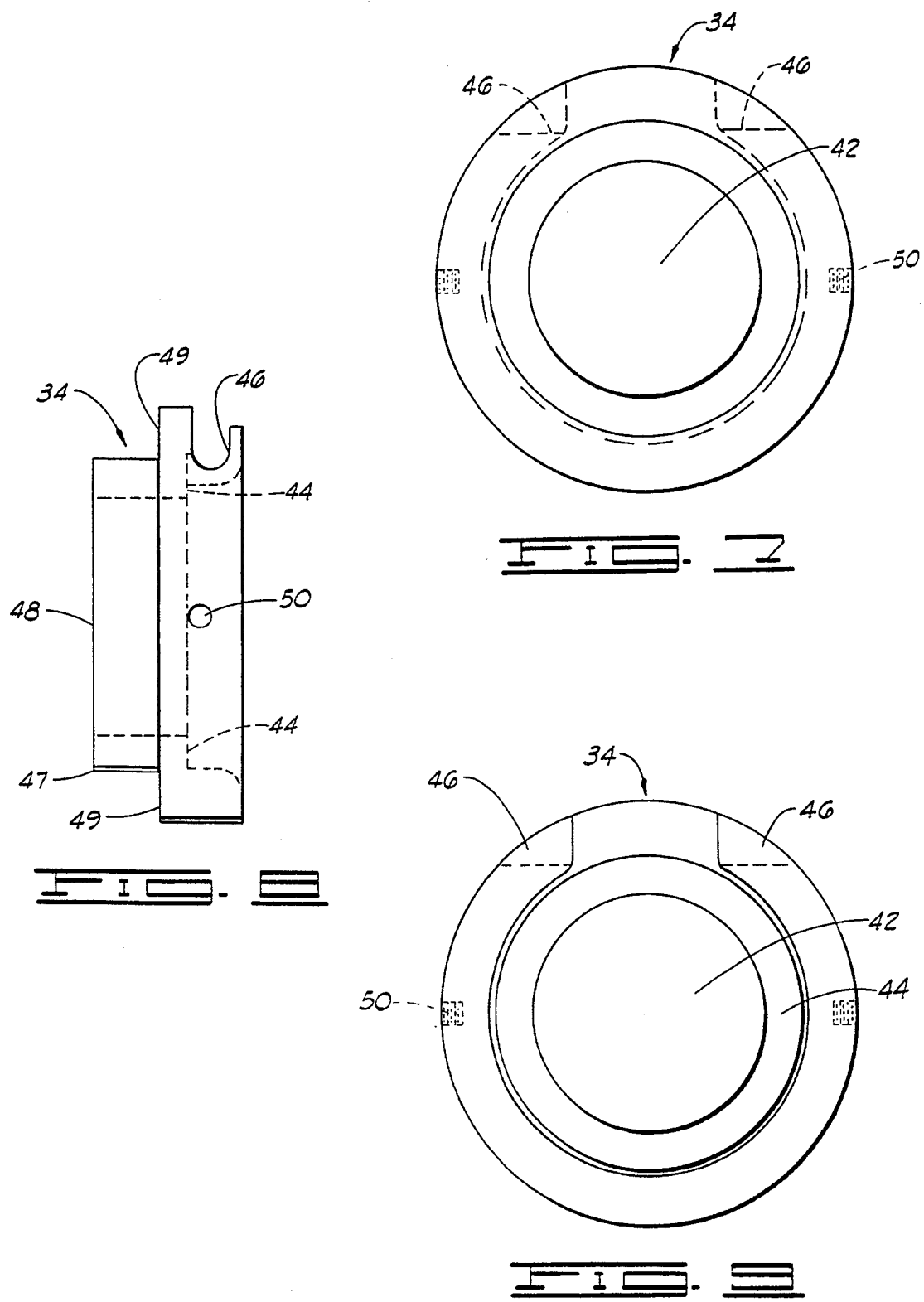

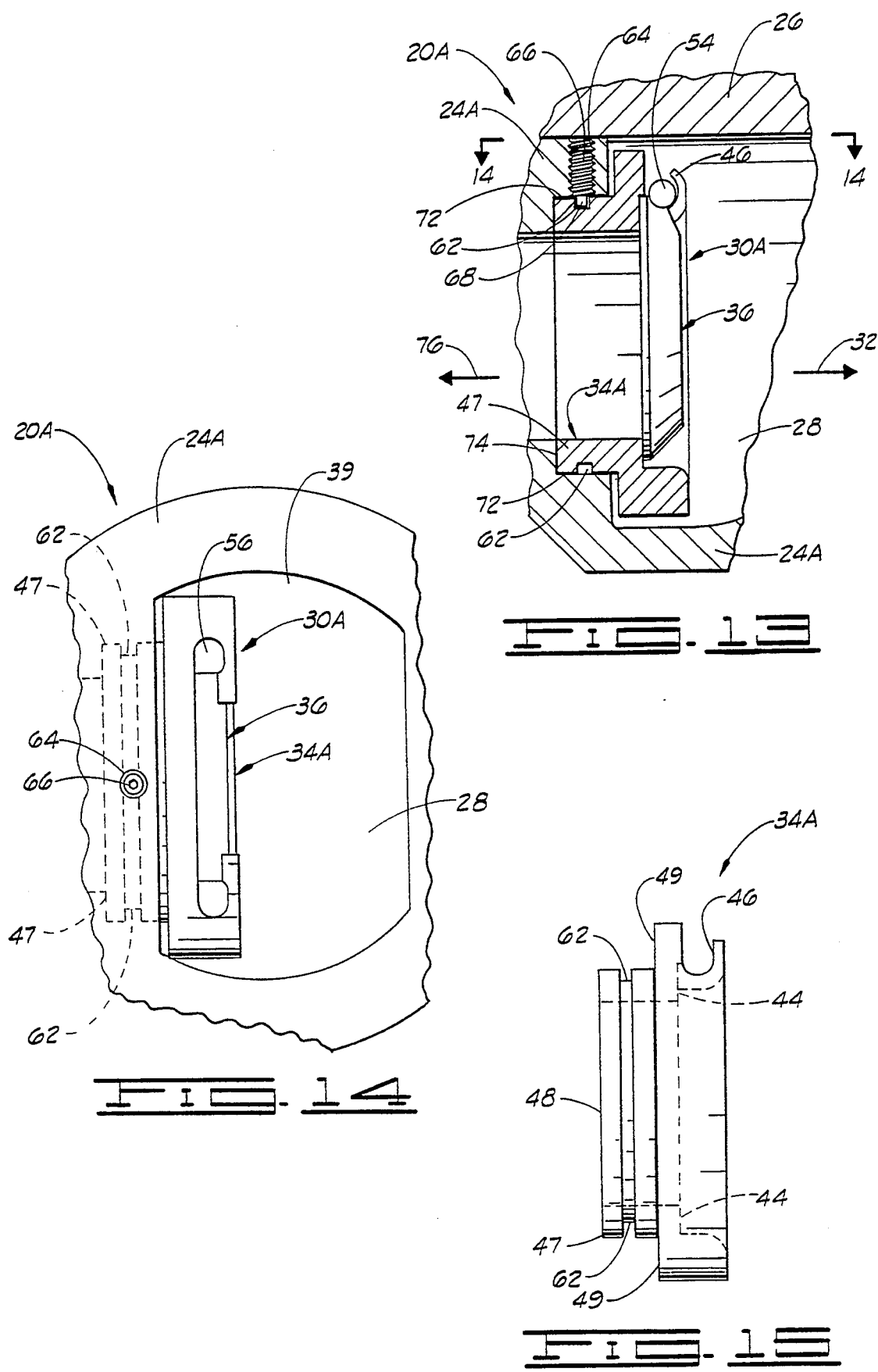

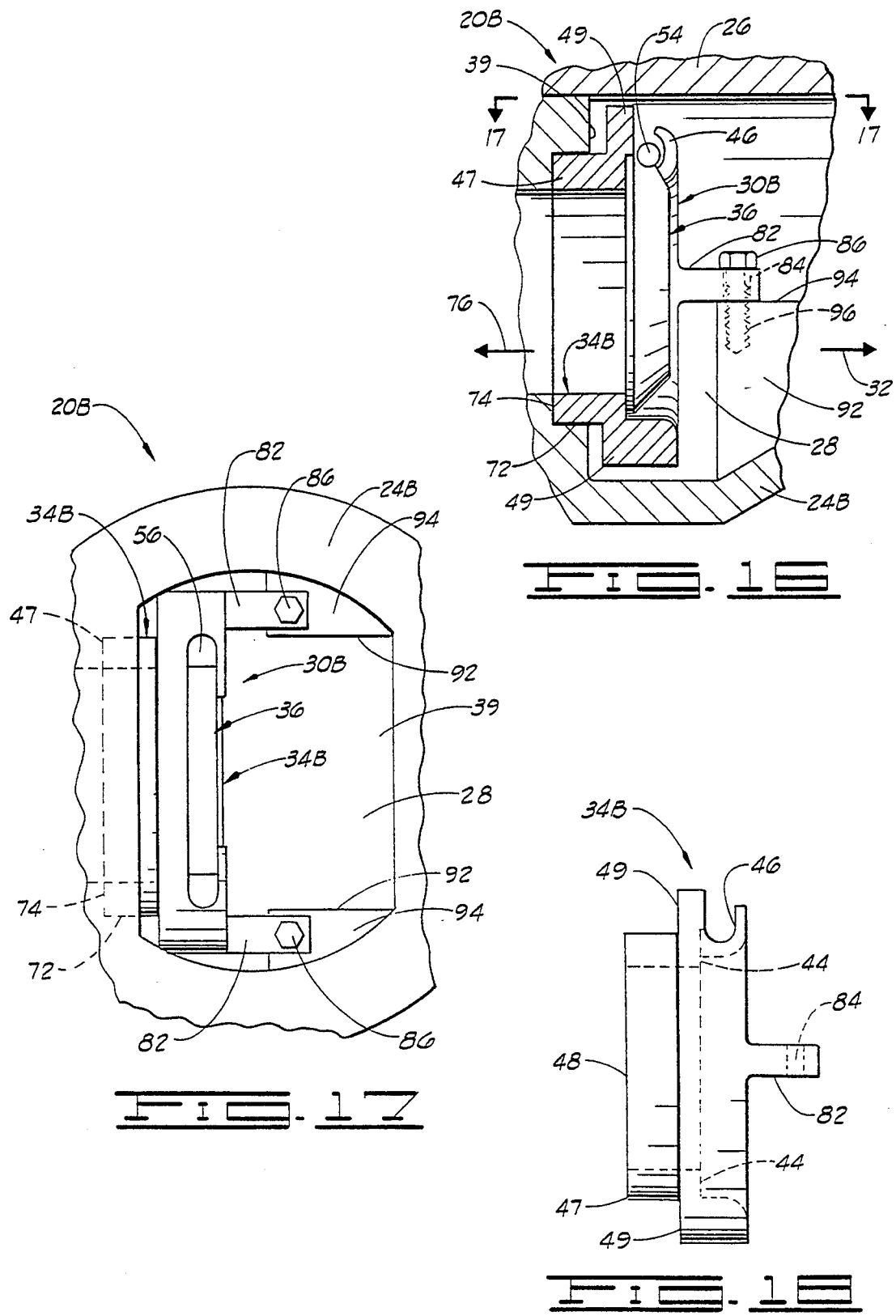

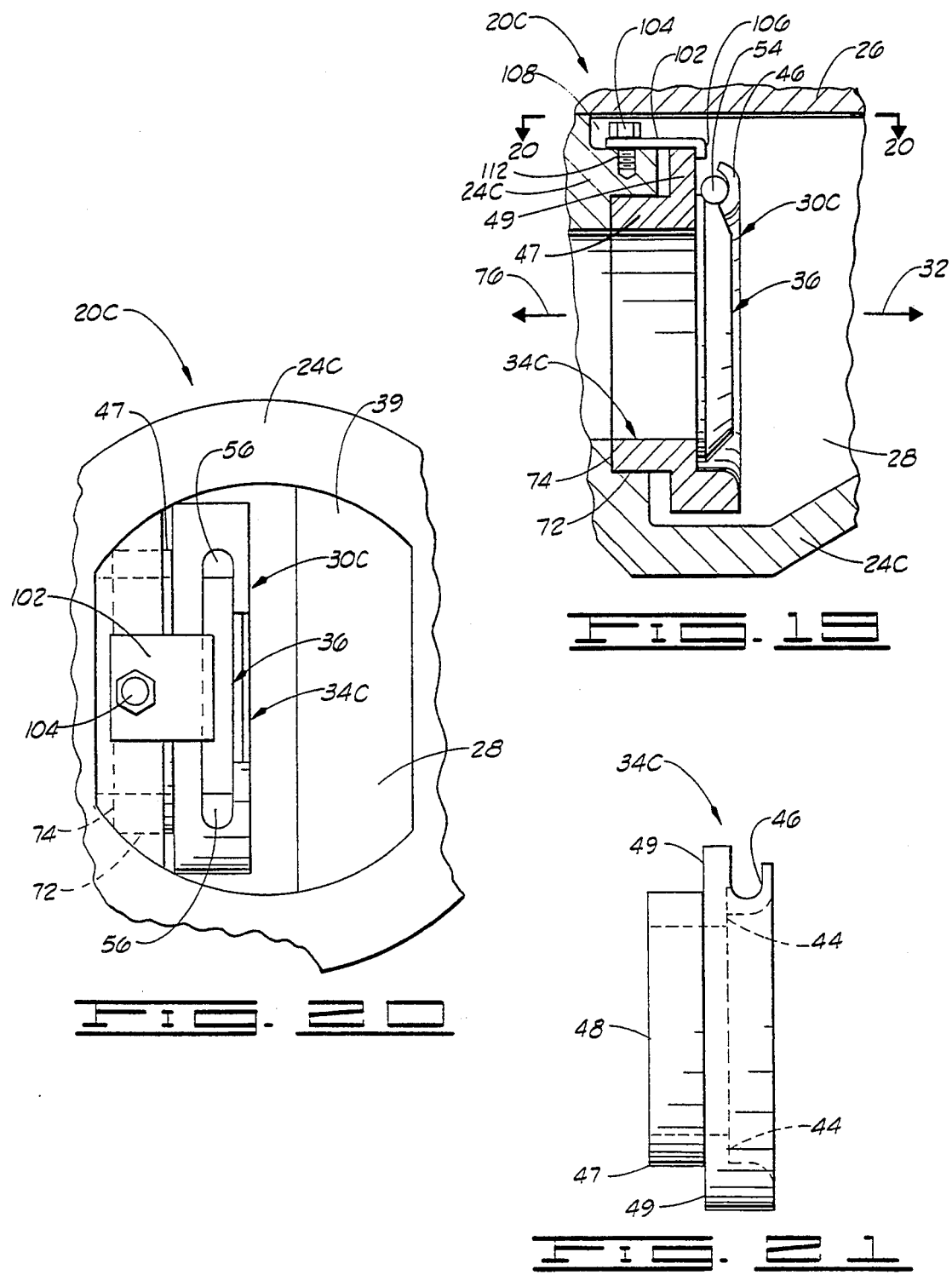

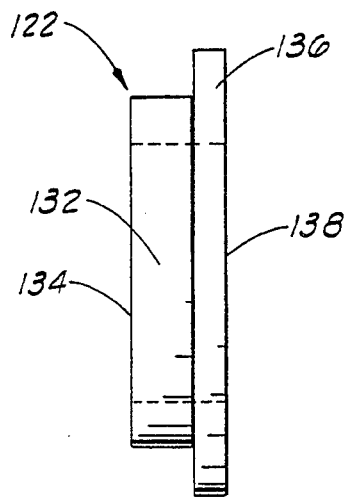
FIG. 24
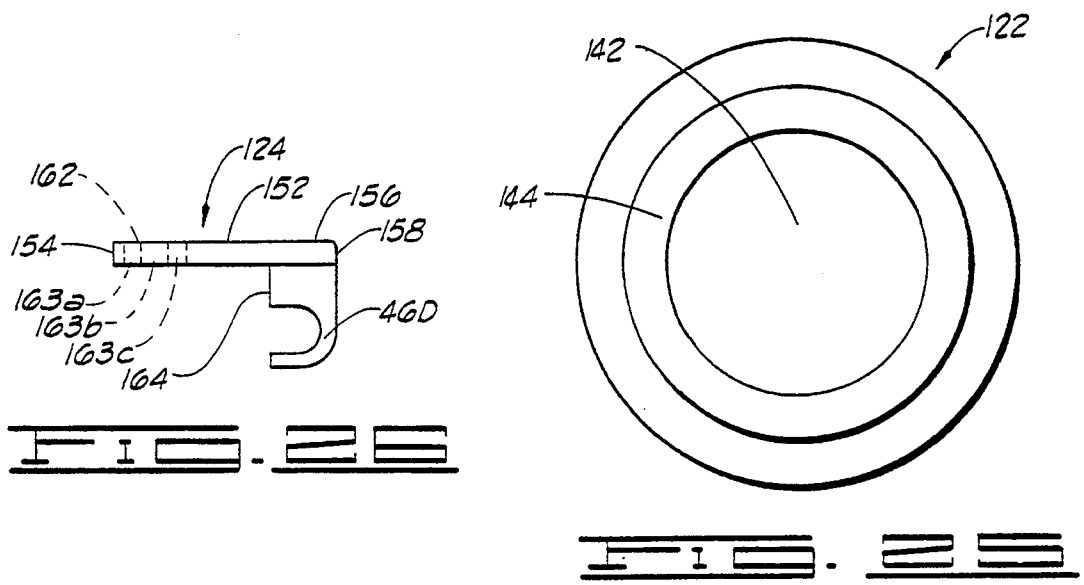
FIG. 26
FIG. 25
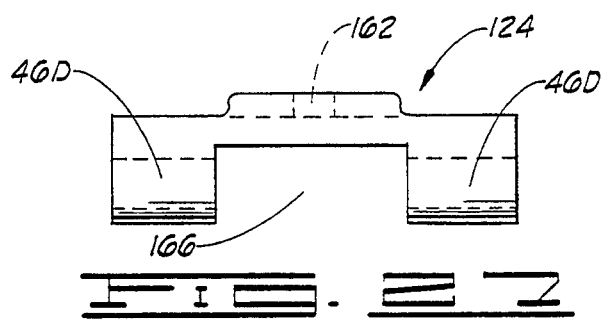
FIG. 27

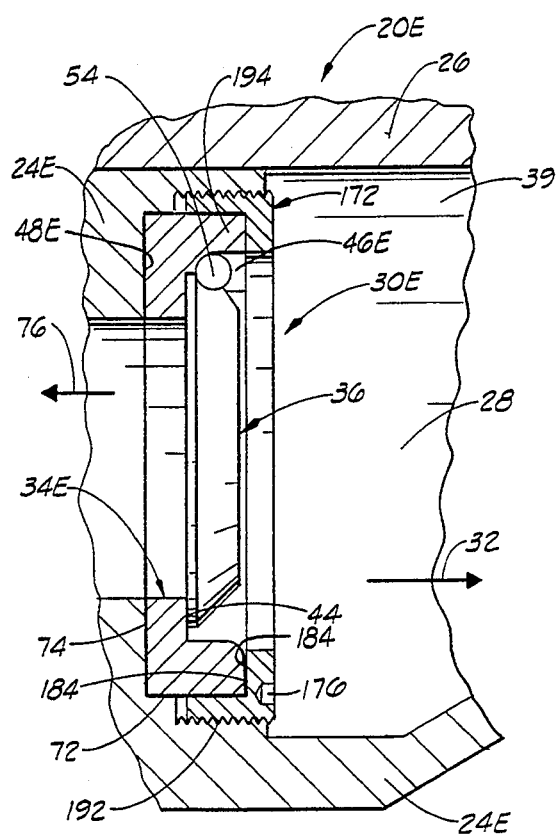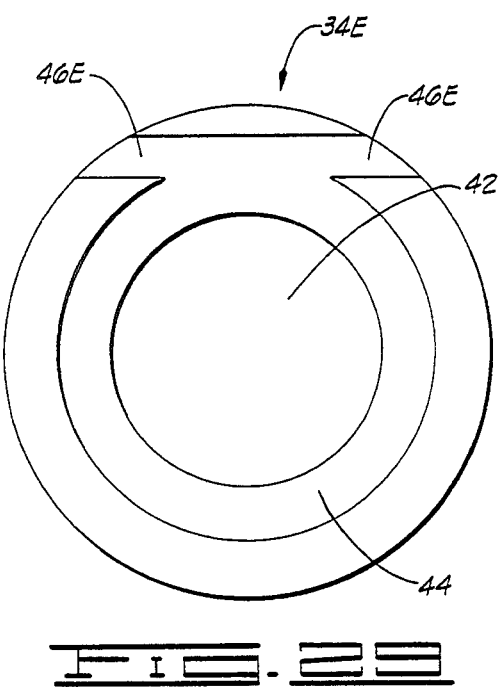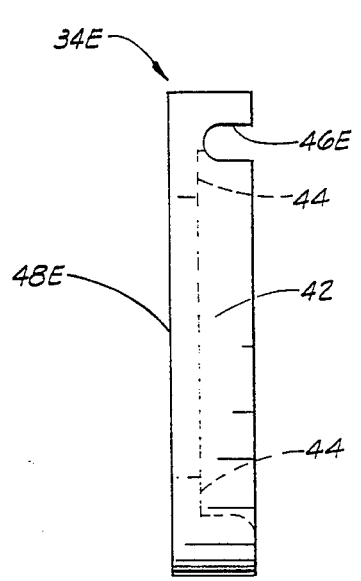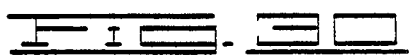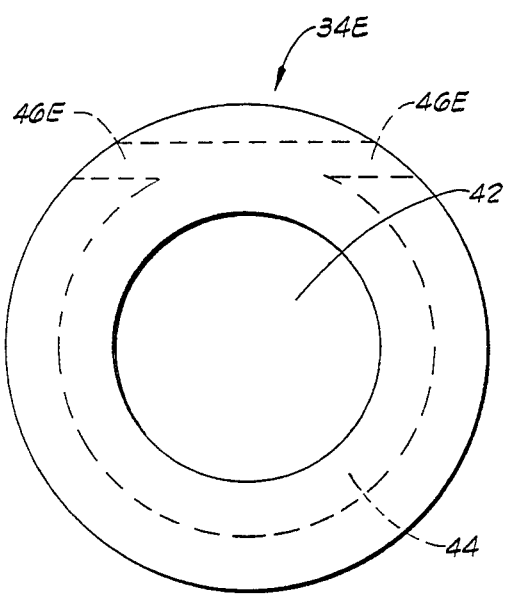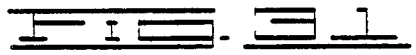

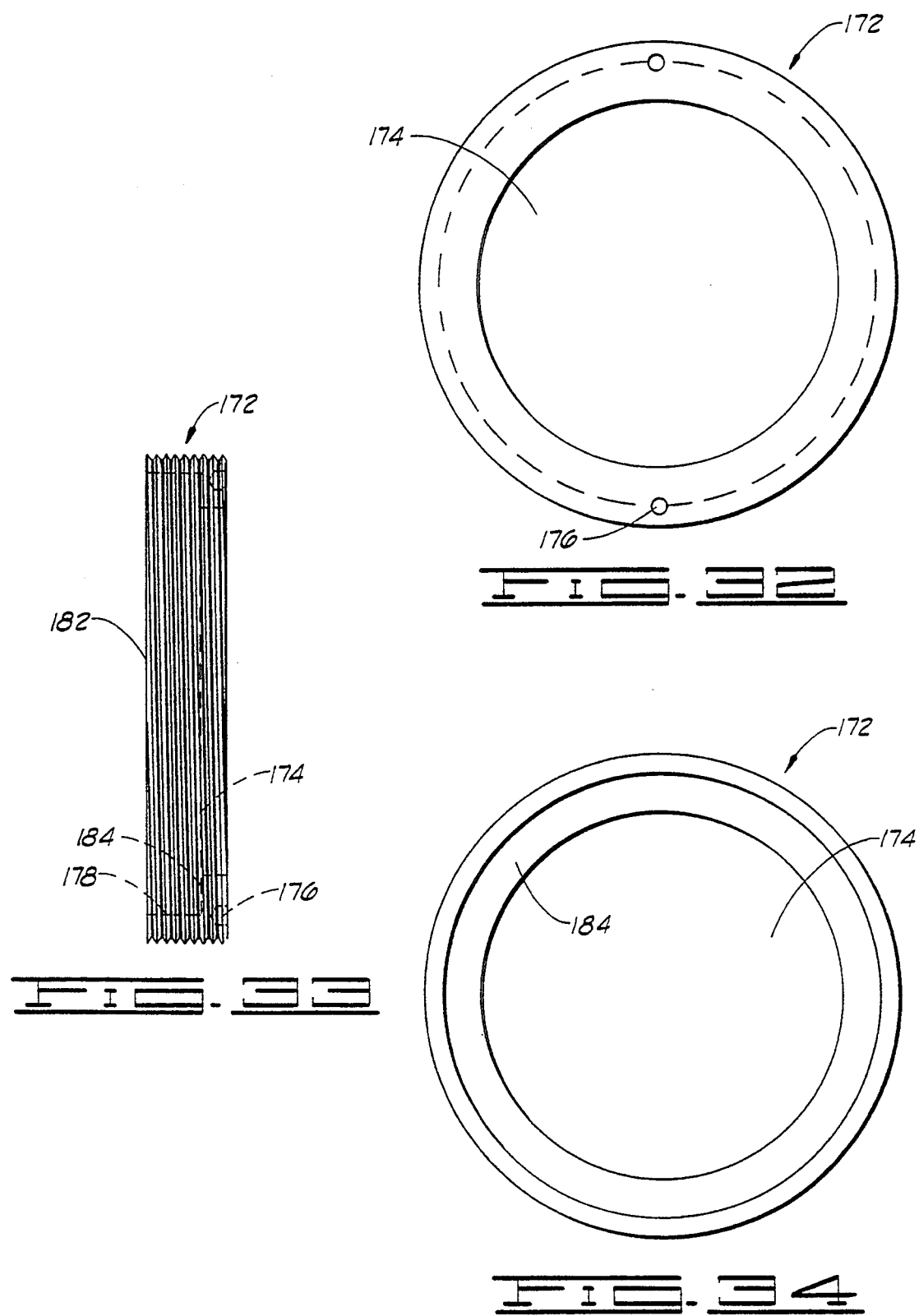

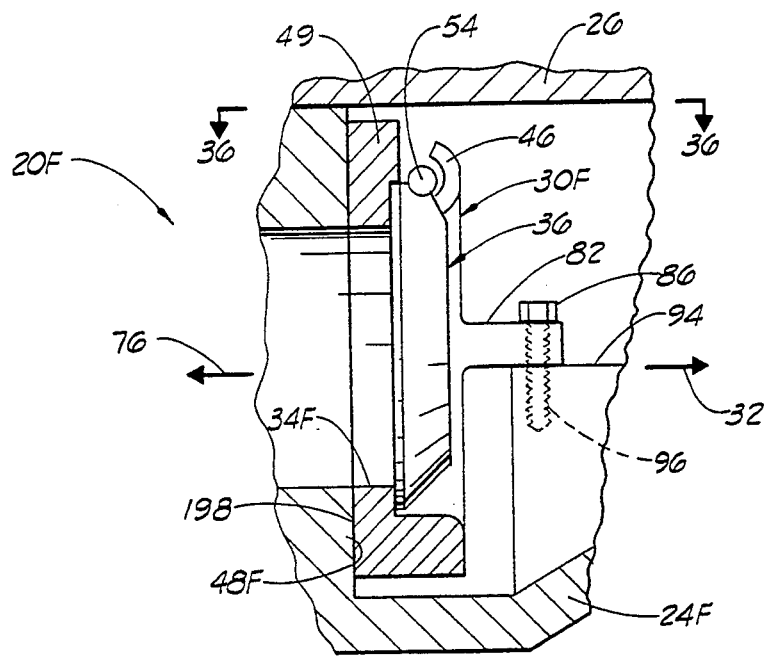
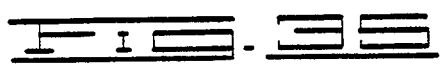
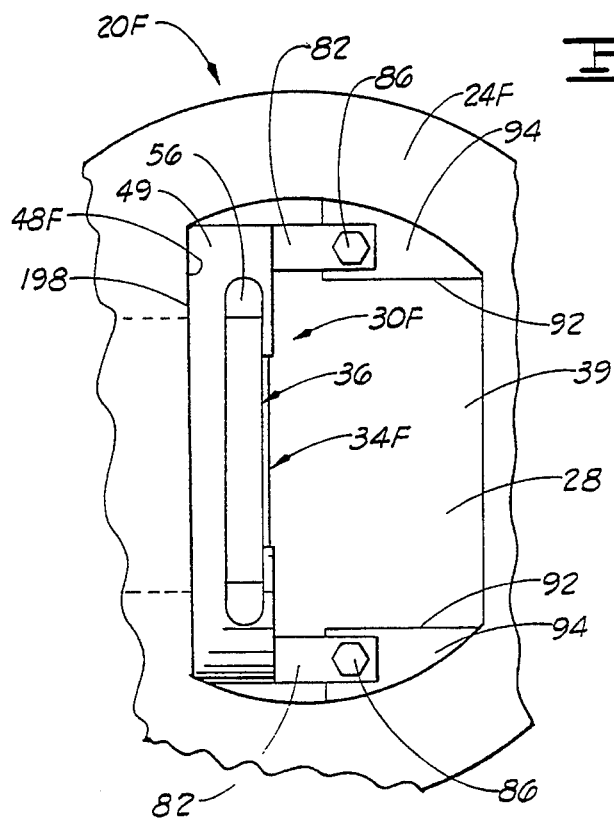
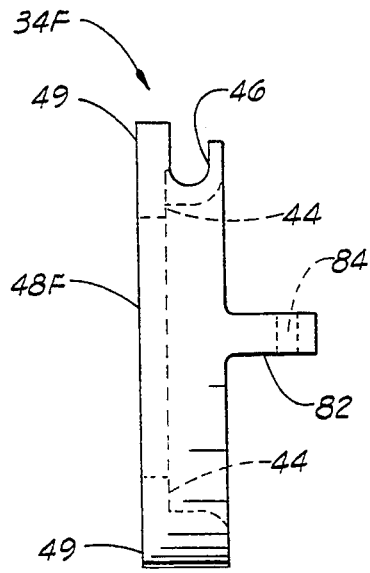
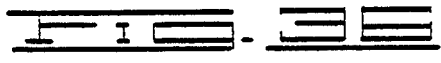
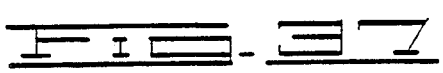

TOP-ENTRY CHECK VALVE WITH THREADED FASTENERS

CROSS REFERENCE TO RELATED APPLICATIONS

This application is a division of application Ser. No. 08/108,146 filed Aug. 17, 1993, now U.S. Pat. No. 5,307,835 issued May 3, 1994, which is a continuation application of User. No. 07/961,106, filed Oct. 14, 1992, now abandoned, which is a division of Ser. No. 07/762,540 filed Sep. 18, 1991, now U.S. Pat. No. 5,161,570 issued Nov. 10, 1992.

This application is related to the following applications filed Sep. 18, 1991:

Top-Entry Check Valve Having Retainer Ring, application Ser. No. 07/762,104, now abandoned, of which a continuing application Ser. No. 08/000,824 was filed Jan. 4, 1993, now U.S. Pat. No. 5,236,007 issued Aug. 17, 1993.

Top-Entry Check Valve With Screw-In Seat, application Ser. No. 07/762,514, now U.S. Pat. No. 5,161,566 issued Nov. 10, 1992.

Top-Entry Check Valve Having Spring Retainer, application Ser. No. 07/762,517, now U.S. Pat. No. 5,156,183 issued Oct. 20, 1992.

Top-Entry Check Valve With Cartridge Secured By Projections, application Ser. No. 07/761,594, now U.S. Pat. No. 5,143,113 issued Sep. 1, 1992.

Top-Entry Check Valve With Cartridge Secured By Threaded Projections, application Ser. No. 07/762,811, now U.S. Pat. No. 5,143,112 issued Sep. 1, 1992.

Top-Entry Check Valve With Pin Fasteners, application Ser. No. 07/762,539, now U.S. Pat. No. 5,156,182 issued Oct. 20, 1992.

FIELD OF THE INVENTION

This invention relates to improvements in top-entry swing check valves.

SUMMARY OF THE INVENTION

The present invention provides a top-entry check valve with smooth, straight chamber which minimizes both turbulence anti pressure drop of the fluid passing through the valve. The relatively small cavity of this design allows an overall reduction in size and weight over conventional top-entry check valves.

The cartridge assembly of the valve includes a seat, a cage and a disc. The seat and cage is a unitary structure in order to make replacement of the seat and cage more easily accomplished.

A removable bonnet is attached over the access opening to the valve chamber. With the bonnet detached, the seat, cage and disc can readily be replaced.

An annular shoulder in the valve chamber prevents the valve cartridge from moving in an upstream direction. At least one threaded fastener is utilized to prevent downstream movement of the valve cartridge.

Additional advantages and features will become apparent from the detailed description of the preferred embodiments of the invention when read in conjunction with the drawings and appended claims.

BRIEF DESCRIPTION OF THE DRAWINGS

FIG. 1 is a vertical cross-sectional view of a prior art top-entry check valve with turbulent flow.

FIG. 2 is a vertical cross-sectional view of a top-entry check valve constructed in accordance with the present invention and illustrating the smooth flow of fluid through the valve chamber.

FIG. 3 is a side elevation of a top-entry check valve constructed in accordance with the present invention with a prior art top-entry check valve shown in outline to illustrate the improved dimensions of the present invention.

FIG. 4 is a vertical cross-sectional view of a portion of a top-entry check valve constructed in accordance with the present invention.

FIG. 5 is a cross-sectional view taken along lines 5—5 of FIG. 4.

FIG. 6 is a cross-sectional view taken along lines 6—6 of FIG. 5.

FIG. 7 is an elevational view of the unitary seat and cage of the valve of FIGS. 4, 5 and 6 from the upstream side.

FIG. 8 is a side elevation of the unitary seat and cage of FIG. 7.

FIG. 9 is an elevational view of the unitary seat and cage of FIG. 7 from the downstream side.

FIG. 13 is a vertical cross-sectional view of a portion of another form of top-entry check valve constructed in accordance with the present invention.

FIG. 14 is a cross-sectional view taken along lines 14—14 of FIG. 13.

FIG. 15 is a side elevation of the unitary seat and cage of the valve of FIG. 13.

FIG. 16 is a vertical cross-sectional view of a portion of yet another form of top-entry check valve constructed in accordance with the present invention.

FIG. 17 is a cross-sectional view taken along lines 17—17 of FIG. 16.

FIG. 18 is a side elevation of the unitary seat and cage of the valve of FIG. 16.

FIG. 19 is a vertical cross-sectional view of a portion of another form of top-entry check valve constructed in accordance with the present invention.

FIG. 20 is a cross-sectional view taken along lines 20—20 of FIG. 19.

FIG. 21 is a side elevation of the unitary seat and cage of the valve of FIG. 19.

FIG. 24 is a side elevation of the seat of the valve of FIGS. 22 and 23.

FIG. 25 is an elevational view of the seat of FIG. 24 from the downstream side.

FIG. 26 is a side elevation of the cage of the valve of FIGS. 22 and 23.

FIG. 27 is an elevational view of the cage of FIG. 26 from the downstream side.

FIG. 28 is a vertical cross-sectional view of a portion of another form of top-entry check valve constructed in accordance with the present invention.

FIG. 29 is an elevational view of the unitary seat and cage of the valve of FIG. 28 from the downstream side.

FIG. 30 is a side elevation of the unitary seat and cage of FIG. 29.

FIG. 31 is an elevational view of the unitary seat and cage of FIG. 29 from the upstream side.

FIG. 32 is an elevational view of the threaded retainer of the valve of FIG. 28 from the downstream side.

FIG. 33 is a side elevation of the threaded retainer of FIG. 32.

FIG. 34 is an elevational view of the threaded retainer of FIG. 32 from the upstream side.

FIG. 35 is a vertical cross-sectional view of a portion of another form of top-entry check valve constructed in accordance with the present invention.

FIG. 36 is a cross-sectional view taken along lines 36—36 of FIG. 35.

FIG. 37 is a side elevation of the unitary seat and cage member of the valve of FIGS. 35 and 36.

DETAILED DESCRIPTION OF THE PREFERRED EMBODIMENTS

Figure 10:
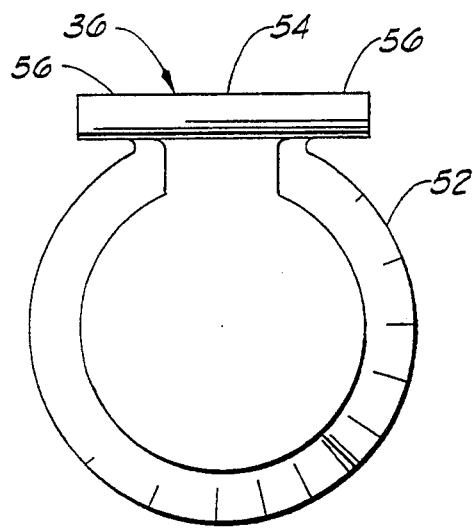
FIG. 10 is an elevational view of the disc of the valve of FIGS. 4, 5 and 6 from the downstream side.

Referring now to the drawings in detail, and to FIG. 1 in particular, the reference numeral 10 generally designates a prior art top-entry check valve. Flow into the valve 10 is indicated by the straight arrows 11. As illustrated by the swirling arrows 12, turbulent flow is created by the high bonnet 14 and large cavity 16. This construction requires machining inside the valve body for the hinge 18 and valve seat 19.

FIG. 2 illustrates a typical top-entry check valve 20 constructed in accordance with the present invention. Flow into the valve 20 is designated by the straight arrows 21. The arrows 22 illustrate the smooth, even flow through valve 20. The improved flow is a result of the relatively straight lines of the valve body 24. The bonnet 26 forms the top wall of the valve chamber 28, such that there is virtually no cavity between the bonnet and the valve chamber, as contrasted with the existence of a cavity 16 in the prior art valve 10. The distance from the center-line 27 of the body 24 to the bottom of the bonnet 26 is approximately the same as the distance from the center-line to the bottom of the valve chamber.

FIG. 3 is a comparison of a conventional, prior art top-entry check valve 10 (partially in outline) and a check valve 20 constructed in accordance with the present invention (shown in full lines). This comparison illustrates the reduction in size and weight accomplished by the present invention. The drawing also shows the use of flanges 29 at the upstream and downstream ends of the valve 20, although it will be understood that the valve body 24 can be fitted with any desired connecting arrangement.

It will also be understood that the following embodiments include the use of standard seals, such as elastomeric O-ring seals, to provide fluid-tight engagement between various surfaces. Such seals are installed in a conventional manner where needed to prevent leakage of fluid between the valve components. These seals are omitted from the drawings in order to illustrate more clearly the preferred embodiments of the present invention.

EMBODIMENT OF FIGS. 4, 5 AND 6

In FIGS. 4, 5 and 6, the central portion of a valve 20 constructed in accordance with the present invention is shown enlarged. As shown in these figures, the valve chamber 28 receives a valve cartridge assembly, generally designated by reference character 30. The valve cartridge assembly 30 controls the flow of fluid through the valve 20. The valve cartridge assembly 30 basically comprises a unitary valve seat and cage member 34 and a valve disc 36 supported on the member 34. As best illustrated by FIG. 5, a plurality of threaded fasteners extend through the valve body 24 and into the valve cartridge 30. A bolt, indicated by reference number 38, is generally representative of the threaded fasteners. An access opening 39 allows installation and removal of the valve cartridge assembly 30, when the bonnet 26 is detached from the valve body 24.

The unitary seat and cage 34 of the valve 20 is shown separately in FIGS. 7, 8 and 9. The seat/cage 34 is generally circular with a flow opening 42 therethrough. An annular seating face 44 around the flow opening 42 is sized and shaped to mate with the disc 36. A pair of hinge pin supports 46 extend generally radially in the seat/cage 34 to suspend the disc 36 in the valve cartridge assembly 30. A plurality of threaded holes, sized and shaped to receive the threaded fasteners 38, extend into the unitary seat and cage 34. One of the threaded holes is designated by reference numeral 50 and generally represents the plurality of threaded holes formed in the unitary seat and cage 34. As best shown in FIG. 8, a reduced diameter extension 47 is formed on the upstream end 48 of the unitary seat and cage 34 and an annular shoulder 49 extends around the unitary seat and cage member 34. FIG. 8 also illustrates that the hinge pin supports 46 are generally U-shaped in cross-section.

Figure 11:
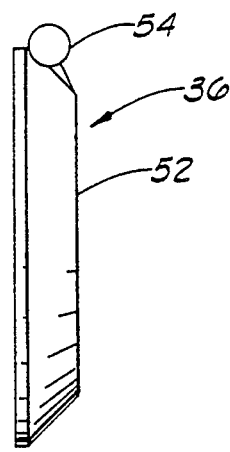
FIG. 11 is a side elevation of the disc of FIG. 10.
Figure 12:
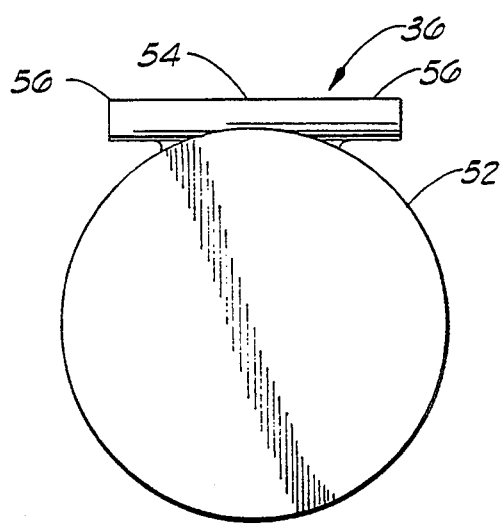
FIG. 12 is an elevational view of the disc of FIG. 10 from the upstream side.

The disc 36 of the valve 20 is shown separately in FIGS. 10, 11 and 12. The disc 36 is a generally circular flat plate 52. At least one hinge pin 54, with end portions 56, extends at a tangent from the plate 52. As discussed hereinafter, the end portions 56 of the hinge pin 54 pivotally support the disc 36 within the valve 20.

The arrangement of the valve cartridge assembly 30 in the valve chamber 28 is disclosed in FIGS. 4, 5 and 6. As described hereinabove, the valve cartridge assembly 30 comprises a unitary seat and cage member 34 and a valve disc 36. The upstream end portion 48 of the unitary seat and cage member 34 has a reduced diameter extension 47 which fits into a mating counterbore 72 in the valve body 24. The counterbore 72 forms an annular shoulder 74 facing downstream to mate with the upstream end 48 of the member 34. This arrangement prevents movement of the valve cartridge assembly 30 in the upstream direction indicated by arrow 76.

As best illustrated by FIGS. 4 and 6, the hinge pin supports 46 of the unitary seat and cage member 34 cradle the end portions 56 of the hinge pin 54 of the disc 36 to suspend the disc 36 within the valve cartridge assembly 30. The disc 36 pivots about the axis of the hinge pin 54 to close against the seating face 44 of the unitary seat and cage member 34 and prevent flow through the valve cartridge assembly 30 in the upstream direction 76. Conversely, the disc 36 pivots about the axis of the hinge pin 54 to open away from the seating face 44 of the unitary seat and cage 34 and allow unobstructed flow through the valve cartridge assembly 30 in the downstream direction 32.

It is important to note that the hinge pin 54 must be retained in the hinge pin supports 46 in order to prevent the disc 36 from becoming dislodged from its proper pivoting position. Accordingly, the hinge pin supports 46 of the unitary seat and cage member 34 are bent over to trap the hinge pin 54 within the hinge pin supports as illustrated in FIG. 4.

The hinge pin supports 46 are larger than the diameter of the hinge pin 54 and allow the disc 36 to float in the upstream 76 and downstream 32 directions in a near-closed position. This "float" of the disc 36 minimizes damage and wear on the hinge pin 54, hinge pin supports 46 and disc 36.

Referring now to FIG. 5, each bolt 38 extends through a corresponding hole 78 in the valve body 24 and is secured into the respective threaded hole 50 in the seat and cage member 34. By extending through the valve body 24 and securing to the seat and cage member 34, the plurality of bolts 38 prevent movement of the valve cartridge assembly 30 in the downstream direction 32. While FIGS. 4, 5 and 6 show the use of two bolts 38, it will be appreciated that other quantities and types of threaded fasteners could be utilized.

FIG. 5 illustrates the accessibility of the valve cartridge assembly 30 with the bonnet 26 detached. By unscrewing the threaded fasteners 38, the valve cartridge assembly 30 can readily be removed from the valve chamber 28 through the access opening 39. This construction allows easy replacement of the valve cartridge assembly 30 and the least space for accommodating the valve cartridge assembly.

EMBODIMENT OF FIGS. 13, 14 AND 15

FIG. 13 illustrates another form of a valve, indicated by reference character 20A, constructed in accordance with the present invention. The unitary seat and cage member 34A and the valve body 24A are modified to employ another threaded fastening arrangement. Reference character 30A generally designates the valve cartridge assembly of this embodiment, comprising the unitary seat and cage member 34A and the disc 36.

As shown in FIGS. 13, 14 and 15, a groove 62 is formed in the outer periphery of a medial portion of the reduced diameter extension 47 of the seat and cage member 34A. A threaded hole 64 extends completely through the valve body 24 from the bonnet 26 to the mating counterbore 72. The threaded hole 64 is sized and shaped to receive a threaded fastener 66. The threaded hole 64 and the threaded fastener 66 are accessible from the access opening 39 when the bonnet 26 is detached. The threaded hole 64 aligns with the groove 62 of the reduced diameter extension 47 when the seat and cage member 34A is installed in the mating counterbore 72.

As best shown in FIG. 13, the threaded fastener 66 has a protrusion 68 from one end. The protrusion 68 is sized and shaped to fit into the groove 62 of the reduced diameter extension 47. When the reduced diameter extension 47 of the unitary seat and cage member 34A is installed in the mating counterbore 72 and the threaded fastener 66 is screwed into the threaded hole 64, the protrusion 68 extends into the groove 62 of the reduced diameter extension 47. The threaded engagement of the threaded fastener 66 with the threaded hole 64 and the extension of the protrusion 68 into the groove 62 of the reduced diameter extension 47 prevents movement of the valve cartridge assembly in the downstream direction 32.

FIG. 14 illustrates the accessibility of the valve cartridge assembly 30A with the bonnet 26 detached. The threaded fastener 66 is unscrewed enough that the protrusion 68 does not extend into the groove 62. The reduced diameter extension 47 can then be moved downstream out of the counterbore 72 and the valve cartridge assembly 30A can be removed from the valve chamber 28 through the access opening 39. Installation of the valve cartridge assembly 30A is accomplished simply by inserting the reduced diameter extension 47 of the seat and cage 34A into the counterbore 72 and screwing in the threaded fastener 66 until the protrusion 68 extends into the groove 62.

EMBODIMENT OF FIGS. 16, 17 AND 18

Referring now to FIG. 16, reference character 20B designates another form of a valve constructed in accordance with the present invention. The valve body 24B and unitary seat and cage member 34B embody another threaded fastening arrangement. The reference character 30B designates the valve cartridge assembly, comprising the unitary seat and cage member 34B and the disc 36.

The seat and cage member 34B is shown separately in FIG. 18. The seat and cage 34B is exactly like the seat/cage 34, except that seat/cage 34B does not require threaded holes and is formed to have a pair of downstream extensions 82. Each downstream extension 82 has a hole 84 therethrough for the insertion of a threaded fastener 86.

The valve body 24B is formed with a pair of lugs 92 located downstream from the valve cartridge 30B. The lugs 92 extend into the valve chamber 28 from the valve body 24B to provide a surface of attachment for the downstream extensions 82. Each lug 92 has an upper surface 94 formed with a threaded hole 96 to receive one of the threaded fasteners 86. With the reduced diameter extension 47 of the seat and cage member 34B installed in the mating counterbore 72, at least a portion of the downstream extensions 82 overlap the lugs 92. In this installed position, each hole 84 in each downstream extension 82 aligns with the threaded hole 96 of the corresponding lug 92.

With each threaded fastener 86 inserted through the hole 84 of the corresponding downstream extension 82 and screwed into the threaded hole 96 of the corresponding lug 92, the valve cartridge 30B is prevented from moving in the downstream direction 32. As best shown in FIG. 17, the lugs 92 are located to provide easy access to the threaded fasteners 86 when the bonnet 26 is detached. By removing and installing the threaded fasteners 86, the valve cartridge assembly 30B is easily replaced through the access opening 39.

EMBODIMENT OF FIGS. 19, 20 AND 21

Referring now to FIG. 19, yet another preferred embodiment of the present invention is designated by reference character 20C. In this particular embodiment, a retainer 102 is secured to the valve body 24C with a threaded fastener 104. The valve cartridge assembly of this embodiment is designated by reference character 30C and comprises the unitary seat and cage 34C and the disc 36.

The unitary seat and cage 34C is shown separately in FIG. 21. The seat/cage 34C is identical to the seat and cage 34, except that the seat/cage 34C requires no threaded holes.

The retainer 102 is essentially a flat plate having an upstream portion with a hole therethrough for the insertion of the threaded fastener 104 and a downstream end which is bent over to form a lip 106. A recessed area 108 is formed in the valve body 24C to allow space for the retainer 102 and threaded fastener 104 between the valve body 24C and the bonnet 26. A mating threaded hole 112 for the threaded fastener 104 is formed in the upper surface of the body 24C at the recessed area 108.

As illustrated by FIGS. 19 and 20, the threaded fastener 104 extends through the hole of the retainer 102 and into the mating hole 112 of the body 24C to secure the retainer 102 to the body 24C in the recessed area 108. With the reduced diameter extension 47 of the seat and cage 34C installed in the mating counterbore 72 and the retainer 102 secured to the valve body 24C, the retainer 102 and lip 106 of the retainer 102 mate with the annular shoulder 49 of the seat and cage member 34C. The lip 106 engages the annular shoulder 49 of the seat and cage member 34C to prevent movement of the valve cartridge assembly 30C in the downstream direction 32.

As best shown in FIG. 20, the threaded fastener 104, retainer 102 and valve cartridge assembly 30C are readily accessible through the access opening 39 when the bonnet 26 is detached. This construction allows easy removal and installation of the threaded fastener 104, retainer 102, seat and cage 34C and disc 36.

EMBODIMENT OF FIGS. 22 THROUGH 27

Figure 22:
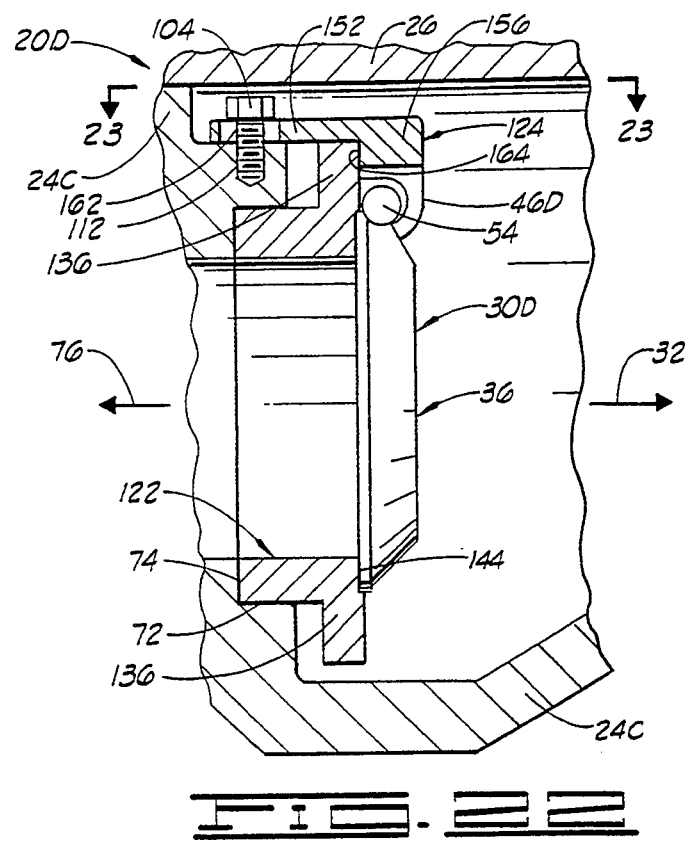
FIG. 22 is a vertical cross-sectional view of a portion of still another form of top-entry check valve constructed in accordance with the present invention.
Figure 23:
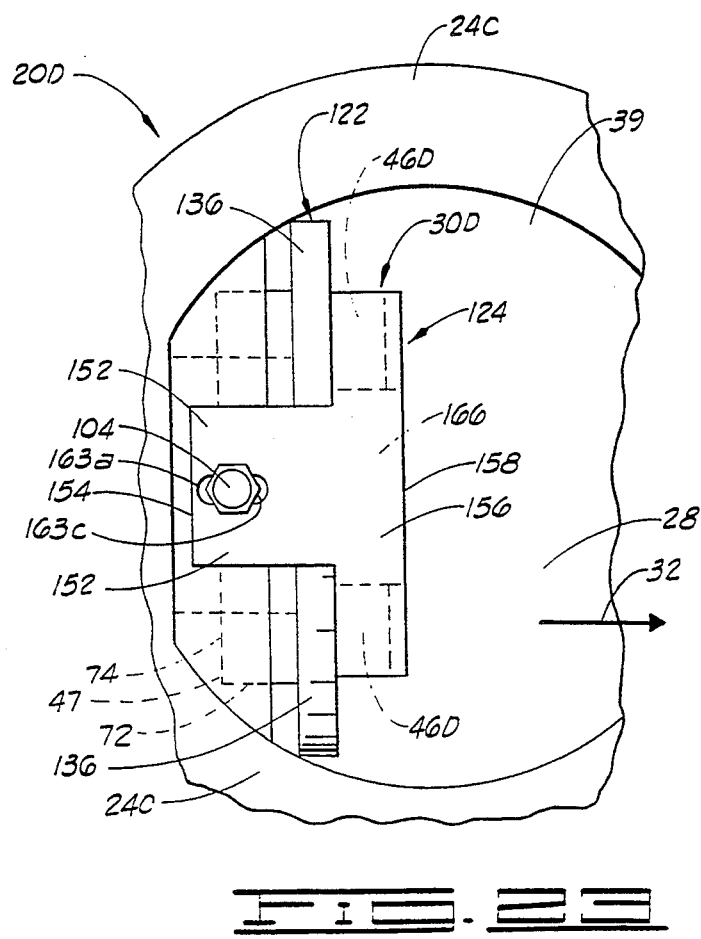
FIG. 23 is a cross-sectional view taken along lines 23—23 of FIG. 22.

FIGS. 22 and 23 illustrate yet another valve 20D constructed in accordance with the present invention. This particular embodiment utilizes a separate seat 122 and a cage-retainer 124 with the modified valve body 24C described hereinabove. The valve cartridge assembly 30D comprises the separate seat 122, the cage-retainer 124 and the valve disc 36.

As shown in FIGS. 24 and 25, the separate seat 122 comprises a reduced diameter portion 132 at the upstream end 134 and an annular shoulder 136 at the downstream end 138. FIG. 25 illustrates the circular shape of the separate seat 122, a flow opening 142 through the seat 122, and the seating face 144 of the seat 122. The seating face 144 is sized and shaped to mate with the disc 36.

FIGS. 26 and 27 illustrate the structure of the cage-retainer 124. As shown in FIG. 26, the cage-retainer 124 has a retainer portion 152 toward upstream end 154 and a cage portion 156 toward downstream end 158. A pair of spaced-apart hinge pin supports 46D, formed in the cage portion 156 of the cage-retainer 124, are generally U-shaped in cross-section and face upstream. A fastener opening 162 extends through the retainer portion 152 of the cage-retainer 124. The fastener opening 162 is in actuality a plurality of intersecting holes, 163a-163b-163c, as indicated by the multiple dashed lines for the fastener opening 162 in FIG. 26. The retainer portion 152 and the cage portion 156 join to form an upstream-facing shoulder 164. As shown in FIG. 27, there is a space between the pair of hinge pin supports 46D.

The arrangement of the valve cartridge assembly 30D in the valve chamber 28 is disclosed in FIGS. 22 and 23. The threaded fastener 104 extends through the fastener opening 162 and into the mating hole 112 in the valve body 24C to secure the cage-retainer 124 in the valve chamber 28. As shown in FIG. 23, the threaded fastener 104 extends through the middle hole 163b of the fastener opening 162. The other holes, 163a and 163c, are visible through the access opening 39. It will be appreciated that the threaded fastener 104 may extend through any one of the holes 163a, 163b or 163c of the fastener opening 162. Each hole 163a–163b–163c extends the cage-retainer 124 a different length in the downstream direction 32. The position of the cage-retainer 124 may therefore be adjusted for different machining tolerances of the seat 122 and disc 36 by inserting the threaded fastener 104 into different holes 163a, 163b or 163c of the fastener opening 162.

As best shown in FIG. 22, the shoulder 164 of the cage-retainer 124 engages the annular shoulder 136 of the seat 122 to prevent movement of the seat 122 in the downstream direction 32. The annular shoulder 136 traps the hinge pin 54 of the disc 36 in the hinge pin supports 46D of the cage-retainer 124. This arrangement prevents the disc 36 from becoming dislodged from the hinge pin supports 46D of the cage-retainer 124. The space 166 in the cage-retainer 124, shown in FIGS. 23 and 27, allows the disc 36 to pivot away from the seating face 144 of the seat 122 without obstruction by the cage-retainer 124.

As shown in FIG. 23, the threaded fastener 104, then the cage-retainer 124, disc 36 and seat 122 can readily be removed from the valve chamber 28 through the access opening 39 with the bonnet 26 detached. This construction allows easy replacement of the valve cartridge assembly 30D or the individual threaded fastener 104, cage-retainer 124, seat 122 or disc 36.

EMBODIMENT OF FIGS. 28 THROUGH 34

Referring now to FIG. 28, reference character 20E designates another form of valve constructed in accordance with the present invention. The unitary seat and cage member 34E is modified and a threaded retainer 172 secures the valve cartridge assembly 30E in the valve chamber 28 of the modified valve body 24E.

The unitary seat and cage member 34E is shown separately in FIGS. 29 through 31. The unitary seat and cage 34E is similar to the unitary seat and cage of previously described embodiments except for two modifications. First, the hinge pin supports 46E of the seat/cage 34E face downstream. Secondly, the unitary seat and cage 34E has no reduced diameter extension at the upstream end 48E.

The threaded retainer 172 is shown separately in FIGS. 32 through 34. As illustrated by FIG. 32 the threaded retainer 172 is generally circular with a flow opening 174 therethrough. A plurality of recesses are formed in the downstream face of the threaded retainer 172. One of the recesses, designated by reference character 176, is generally representative of the plurality of recesses in the threaded retainer 172. As best shown in FIG. 33, the outer periphery of the threaded retainer 172 is threaded. A counterbore 178 extends into a portion of the threaded retainer 172 from the upstream end 182 to form an upstream-facing annular shoulder 184.

The arrangement of the valve cartridge assembly 30E in the valve chamber 28 is disclosed in FIG. 28. The valve body 24E has the counterbore 72 which mates with the upstream end 48E of the unitary seat and cage 34E. In this particular embodiment, the counterbore 72 is formed with an outer counterbore 192 threaded to mate with the threaded retainer 172. The unitary seat and cage 34E fits into the counterbore 72 and the threaded retainer 172 screws into the counterbore 192 around the seat and cage 34E. The annular shoulder 184 of the threaded retainer 172 engages the downstream end of the seat and cage 34E to secure the valve cartridge assembly 30E in the valve chamber 28. The annular shoulder 184 of the threaded retainer 172 also traps the end portions 56 of the hinge pin 54 of the disc 36 in the hinge pin supports 46E of the seat and cage 34E. This construction prevents downstream movement of the valve cartridge assembly 30E and keeps the disc 36 from becoming dislodged from the hinge pin supports 46E of the seat and cage 34E.

The recesses 176 in the downstream face of the threaded retainer 172 are utilized to grip the threaded retainer 172 and screw the threaded retainer 172 into or out of the counterbore 192. With the bonnet 26 detached, the recesses 176 are accessible to a suitable tool for wrenching the threaded retainer 172. After unscrewing the threaded retainer 172, the threaded retainer 172, unitary seat and cage 34E and disc 36 can readily be removed through the access opening 39. This construction allows easy replacement of the valve cartridge assembly 30E, comprising the seat/cage 34E and the disc 36, or the individual replacement of the seat/cage 34E, disc 36 or threaded retainer 172.

EMBODIMENT OF FIGS. 35, 36 AND 37

Referring now to FIG. 35, another preferred embodiment of the present invention is designated by reference character 20F. In this particular embodiment, the valve body 24F and the seat and cage member 34F are modified.

As shown in FIGS. 35 and 36, the valve body 24F has no counterbore 72. The valve body 24F does, however, form an annular surface facing in the downstream direction 32. The downstream face of the valve body 24F is designated by reference character 198. As best shown in FIG. 37, the seat and cage member 34F has no reduced diameter extension 47, but does have an annular upstream end 48F.

FIGS. 35 and 36 illustrate the installation of the valve cartridge assembly 30F in the valve chamber 28. As shown in these figures, the upstream end 48F of the seat and cage member 34F tightly engages the downstream face 198 of the valve body 24F to prevent flow of fluid around the disc 36 in the upstream direction 76. The threaded fastener 86 and lug 92 arrangement keep the valve cartridge assembly 30F from moving in the downstream direction 32.

In other respects, the operation and arrangement of the valve cartridge assembly 30F are exactly like those of the valve cartridge assembly 30B as described hereinabove.

EMBODIMENT OF FIGS. 38 AND 39

Figure 38:
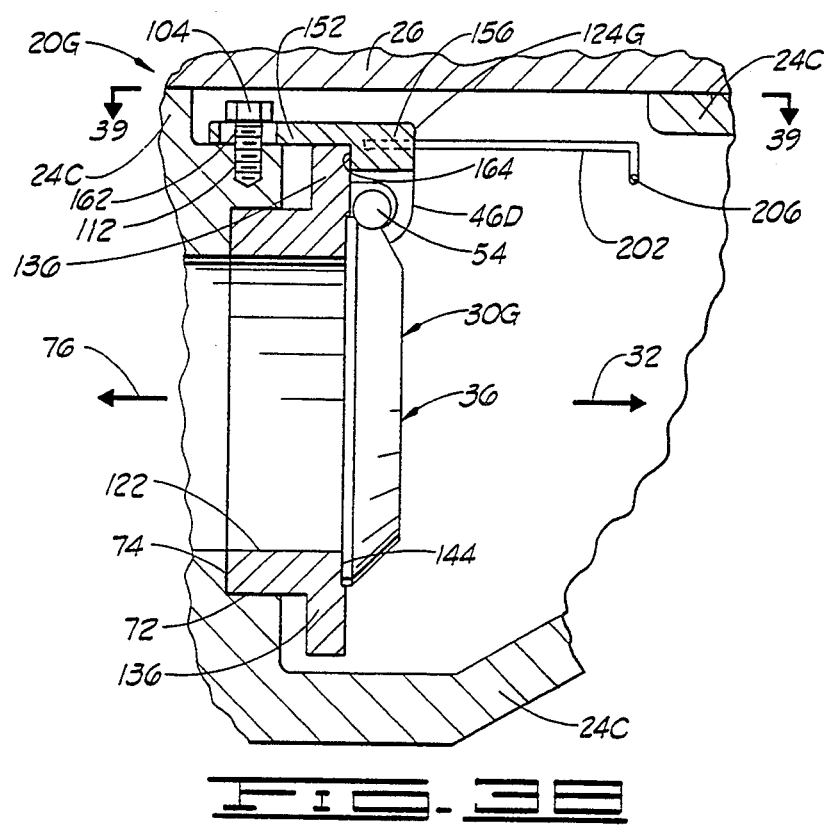
FIG. 38 is a vertical cross-sectional view of a portion of another form of top-entry check valve constructed in accordance with the present invention.
Figure 39:
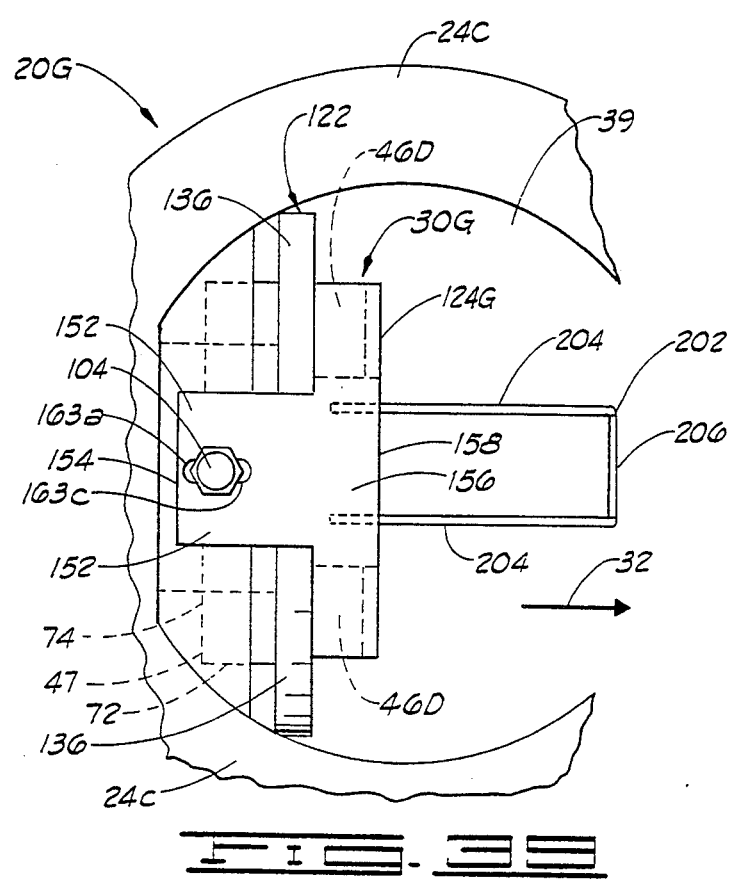
FIG. 39 is a cross-sectional view taken along lines 39—39 of FIG. 38.

Referring now to FIGS. 38 and 39, reference character 20G designates another form of valve constructed in accordance with the present invention. In this particular embodiment, the cage-retainer 124G is a modification of the cage-retainer 124 previously described.

As shown in FIGS. 38 and 39, the cage-retainer 124G includes a cushioning member 202 extending in the downstream direction 32. The cushioning member 202 is somewhat U-shaped, with a pair of substantially parallel legs 204 suitably secured to the cage portion 156 extending downstream and connected at the downstream end by a transverse leg 206. A portion of the downstream end of the cushioning member 202 is bent down such that the disc 36, when swinging away from the seat and cage 34F, strikes the transverse leg 206 of the cushioning member 202 rather than the bonnet 26 or body 24C. In this manner, the cushioning member 202 absorbs the impact of the disc 36 when the disc 36 flies fully open to allow flow in the downstream direction 32. This arrangement reduces wear on the disc 36 and valve body 24C and increases the useful life of the disc 36 and the valve body 24C. Moreover, replacement of the cage-retainer 124G or cushioning member 202, when worn, is much easier and more economical than replacement of the valve body 24C.

Changes may be made in the combinations, operations and arrangements of the various parts and elements described herein without departing from the spirit and scope of the invention as defined in the following claims.

What is claimed is:

1. A top entry check valve comprising:
   a disc having at least one hinge pin extending along a tangent thereto;
   a unitary seat and cage having an upstream end, a downstream end and a seating surface, the seating surface facing downstream and being shaped to mate with said disc; and having a pair of hinge pin supports receiving the opposite end portions of the hinge pin;
   a body having an upstream end, a downstream end, a valve chamber therein communicating with the upstream and downstream ends thereof, and an access opening in a side wall thereof communicating with the valve chamber of a size to accommodate the entry and removal of said disc and said unitary seat and cage therethrough, said body also having an annular shoulder therein facing downstream sized to engage the upstream end of said unitary seat and cage and prevent said unitary seat and cage from moving upstream;
   a bonnet removably attached to said body over said access opening forming a wall of the valve chamber; and
   a retainer ring having an inwardly extending annular shoulder and an upstream end with a threaded outer periphery;
   wherein the body has an inner counterbore and a threaded outer counterbore, a portion of said unitary seat and cage extends into the inner counterbore, and the threaded end of the retainer ring screws into the threaded outer counterbore such that the inwardly extending annular shoulder of the retainer ring engages said unitary seat and cage and prevents said unitary seat and cage from moving downstream.

2. A valve as defined in claim 1 wherein each hinge pin support faces downstream and the inwardly extending annular shoulder of the retainer ring traps the hinge pin in the hinge pin supports.

3. A valve as defined in claim 1 wherein the retainer ring has a downstream-facing surface with a plurality of recesses accessible from the access opening for applying leverage to the retainer ring to turn the retainer ring and screw the retainer ring into the threaded outer counterbore of the body and unscrew the retainer ring from the threaded outer counterbore of the body for the entry and removal of the valve cartridge assembly.

* * * * *

UNITED STATES PATENT AND TRADEMARK OFFICE
CERTIFICATE OF CORRECTION

PATENT NO.: 5,386,847

DATED: February 7, 1995

INVENTOR(S): John P. Scaramucci

It is certified that error appears in the above-identfied patent and that said Letters Patent is hereby corrected as shown below:

Column 1, line 10, "User" should be --Ser--.

Column 1, line 43, "with smooth" should be --with a smooth--.

Column 1, line 44, "anti" should be --and--.

Column 7, lines 56 and 57, "163a-16-3b-163c" should be --163a-163b-163c--.

Signed and Sealed this

Fifth Day of September, 1995

BRUCE LEHMAN

Attest:

Attesting Officer

Commissioner of Patents and Trademarks